United States Patent [19]

Gagnon

[11] 4,098,960
[45] Jul. 4, 1978

[54] FUEL CELL FUEL CONTROL SYSTEM

[75] Inventor: Richard N. Gagnon, Glastonbury, Conn.

[73] Assignee: United Technologies Corporation, Hartford, Conn.

[21] Appl. No.: 754,325

[22] Filed: Dec. 27, 1976

[51] Int. Cl.$^2$ .................. H01M 8/04; H01M 8/06
[52] U.S. Cl. .................................... 429/25; 429/23
[58] Field of Search ................ 429/17, 19, 20–23, 429/25

[56] References Cited

U.S. PATENT DOCUMENTS

| | | | |
|---|---|---|---|
| 3,159,506 | 12/1964 | Salathe | 429/25 |
| 3,607,419 | 9/1971 | Keating | 429/17 |
| 3,668,013 | 6/1972 | Franz | 429/25 |

Primary Examiner—John H. Mack
Assistant Examiner—H. A. Feeley

[57] ABSTRACT

A fuel cell fuel control system is presented in which the fuel processor is isolated from the fuel cell by means of a demand valve. The fuel processor operates at an elevated pressure with the supply of fuel forming constituents being constantly monitored in proportion to the demand based on the pressure downstream of the demand valve and the temperature in the hydrogen reformer.

5 Claims, 4 Drawing Figures

FUEL CELL FUEL CONTROL SYSTEM

BACKGROUND OF THE INVENTION

This invention relates to the field of fuel control systems for fuel cells. More particularly, this invention relates to a fuel control system in which the fuel processor is isolated from the fuel cell by a pressure responsive valve which regulates the flow of fuel forming constituents in proportion to load demands on the fuel cell; and the system also functions to supply fuel as needed to maintain the desired temperature of the fuel reactor.

A fuel cell is a demand system in which the cell operates in response to the load imposed across the cell. Generally, a hydrogen based fuel is used as the fuel supply for the fuel cell, and the hydrogen based fuel is passed through a fuel processor to convert the fuel to pure hydrogen which is then supplied to the fuel cell. In typical prior art systems, the DC load on the fuel cell is sensed and hydrogen and oxygen are delivered to the fuel cell to meet the demand on the cell. Excess hydrogen is delivered from the fuel cell exhaust to the reformer burner of the fuel processor, and the temperature of the reformer is maintained at a desired level by varying the amount of hydrogen delivered to the fuel cell. Such systems operate on the premise that maintaining a constant temperature in the reformer will assure proper fuel supply to the fuel cell to meet the demand. Such systems are generally known as "load following" systems.

The problem with load following systems is that the response time of the fuel cell to change in load is almost instantaneous, whereas the response time of the processor and the flow of materials to the processor and from the processor to the fuel cell is not fast enough to meet the changing load requirements on the fuel cell. Thus, while the response time of the fuel cell to load changes is nearly instantaneous, there is a fixed minimum time delay in the response of the processor and in supplying fuels to the system. Accordingly, as is well known in the art, a time delay is encountered in the response of the processor to the demands of the fuel cell, and this time delay can pose serious operating problems.

Several attempts have been made in the prior art to improve the performance of fuel cells. The patents to Titterington et al U.S. Pat. Nos. 3,098,768, Salathe 3,159,506, Sederquist et al 3,585,078 and Keating 3,607,419 show examples of prior art attempts to control fuel flow in a fuel cell system. However, all of these prior art systems have been less than adequate in meeting the problem for various reasons.

SUMMARY OF THE INVENTION

In accordance with the present invention, the fuel processor is isolated from the fuel cell by a demand valve (sometimes also referred to as an isolation valve) which is responsive to pressures across the valve and functions to vary flow to maintain a desired pressure to the fuel cell, which desired pressure may be constant or programmed. The isolation of the fuel processor from the fuel cell allows the entire fuel processor to operate at an elevated pressure and be used as a reservoir of hydrogen fuel which then becomes available for immediate delivery to the fuel on demand when the load on the fuel cell increases. The availability of a reservoir of hydrogen fuel guarantees excellent transient response of the system.

The hydrogen fuel is fed on demand from the processor to the fuel cell as the load changes. An increase in load causes consumption of more hydrogen, thus lowering the hydrogen pressure in the cell. That reduced pressure causes the demand valve to increase the fuel flow to maintain the set pressure to the fuel cell downstream of the valve. Conversely, a decrease in load will result in reduced fuel flow to maintain the desired fuel cell pressure.

The hydrogen fuel is also fed to the reformer burner to maintain the reformer at the proper reaction temperature. The hydrogen fed to the reformer burner is delivered to the fuel cell first to insure that sufficient hydrogen is available to support the power load on the fuel cell. Thus, there is a surplus of hydrogen fuel flow to the fuel cell stack to insure good hydrogen distribution to all active cell sites. This surplus hydrogen is then delivered fom the fuel cell to the reformer burner to maintain the desired temperature in the reformer burner. Fuel flow from the fuel cell to the burner of the reformer is controlled by a temperature responsive valve. If the temperature responsive valve opens to increase the fuel flow to the reformer burner, the demand valve between the processor and the fuel cell will sense a pressure drop in the fuel cell, and the demand valve will respond to deliver more hydrogen fuel to the fuel cell to rebalance the system and thus provide the fuel required for proper operation of both the fuel cell and the reformer.

The control system of the present invention has the ability to control the amount of fuel required by the processor and to determine the proper ratio of raw fuel, steam and recirculated hydrogen. The system operates by sensing the pressure upstream of the demand valve and using that pressure to position proportioning valves to constantly regulate or proportion the supply of raw fuel, steam and recirculated hydrogen to assure an adequate supply of pressurized hydrogen on demand.

In a companion case filed contemporaneously herewith and assigned to the same assignee, application Ser. No. 754,181, hydrogen and/or a raw fuel-steam mixture are stored under pressure in an accumulator in the system, the pressure being sufficient to deliver fuel to the fuel cell on demand. If the pressure of stored material drops below a predetermined level, on/off valves will be actuated to deliver more raw fuel and steam to replenish the fuel supply. The valves are deactivated when the desired pressure level is restored.

Accordingly, one object of the present invention is to provide a novel and improved fuel cell fuel control system.

Another object of the present invention is to provide a novel and improved fuel cell fuel control system having significantly improved reaction time in response to load changes on the fuel cell.

Still another object of the present invention is to provide a novel and improved fuel cell fuel control system in which the fuel processor is isolated from the fuel cell by a pressure regulating demand valve to improve the response time for delivering fuel to the fuel cell both in response to changed loads on the fuel cell and to changes in reformer temperature.

Still another object of the present invention is to provide a novel and improved fuel cell fuel control system in which the processor is isolated from the fuel cell by a pressure responsive demand valve which permits storage of fuel upstream of the demand valve to improve the response time of the system to changing loads on the fuel cell.

Still another object of the present invention is to provide a novel and improved fuel cell fuel control system in which fuel materials are continuously delivered as a function of the pressure upstream of a valve isolating the processor from the fuel cell.

Other objects and advantages of the present invention will be apparent to and understood by those skilled in the art from the following detailed description and drawings.

BRIEF DESCRIPTION OF THE DRAWINGS

Referring now to the drawings.

DESCRIPTION OF THE PREFERRED EMBODIMENT

Figure 1:
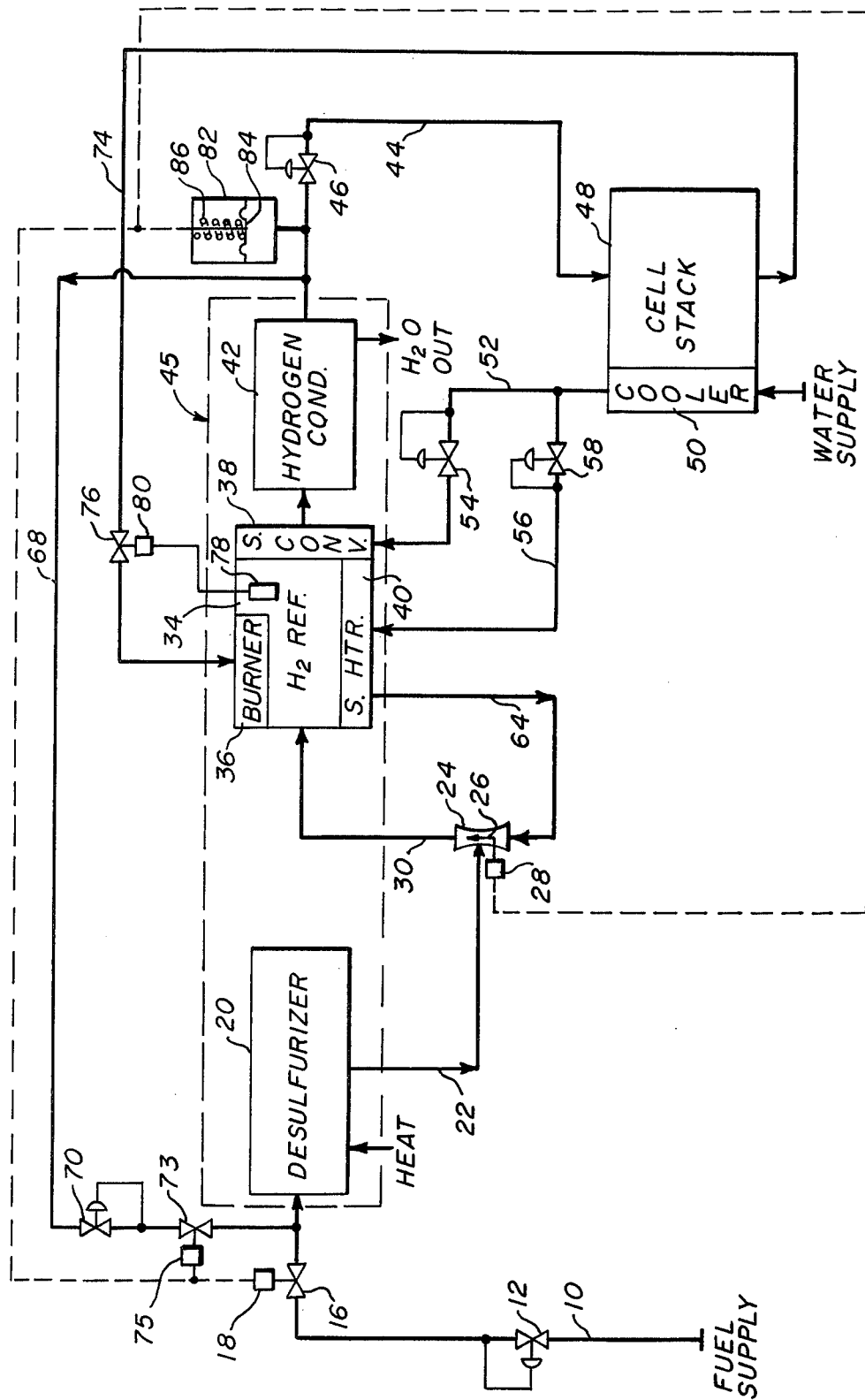
FIG. 1 is a schematic representation of a fuel cell system incorporating the present invention.

Referring to FIG. 1, raw fuel from any suitable fuel supply source is delivered through a supply line 10 through a fuel pressure regulator 12 and then through a proportioning fuel valve 16, which is controlled by an actuator 18, to a desulfurizer 20. The raw fuel, which is preferably any hydrocarbon based fuel known to be suitable for fuel cell use, is heated in desulfurizer 20 in a manner known in the art to remove sulfur from the fuel. The desulfurized fuel is then delivered via conduit 22 to an ejector 24 where it is drawn in and mixed with steam from a source to be described hereinafter. Ejector 24 has a variable flow area determined by a movable pintle 26 and the operation of pintle 26 is determined by an actuator 28. A mixture of desulfurized fuel and steam is delivered from ejector 24 via line 30 to hydrogen reformer 34 which includes a burner 36, a shift converter 38 and a superheater 40. The raw fuel and steam mixture delivered to hydrogen reformer 34 is converted to a hydrogen-rich stream in the reformer in accordance with techniques well known in the art. The raw fuel is typically steam reformed in the presence of a catalyst to the individual constituents of the fuel which typically are hydrogen, carbon dioxide, carbon monoxide, and certain residual water and methane. The steam reformed fuel then passes through shift converter 38 where carbon monoxide reacts with residual water to produce carbon dioxide and additional hydrogen. The resultant hydrogen rich feed stock is then delivered to hydrogen condenser 42 where water is separated and relatively pure hydrogen is then delivered to a fuel cell supply conduit 44. The desulfurizer 20, reformer 34 and condenser 42 may collectively be referred to as a processor 45.

The hydrogen fuel then flows from condenser 42 through a pressure regulating valve 46 and then to fuel cell stack 48 to power the fuel cell. Pressure regulating valve 46 serves to isolate the fuel cell stack from the fuel processor elements upstream of the pressure regulating valve; and, as will be seen, pressure regulating valve 46 responds to the load demand on the fuel cell to regulate the flow of fuel in response to the demand to maintain a desired gas pressure in the fuel cell downstream of the valve. Valve 46 is preferably responsive to the pressure in line 44 downstream of the valve, but it will be understood that valve 46 may be responsive to any parameter which varies in accordance with the load on the fuel cell.

Water is delivered to heat exchanger 50 in fuel cell 48 to cool the fuel cell. The heated water (typically steam) discharged from heat exchanger 50 is delivered via line 52 and a back pressure regulating valve 54 to shift converter 38; and the steam is also delivered via conduit 56 through pressure regulating valve 58 to superheater 40 of the hydrogen reformer. Superheated steam discharged from superheater 40 is delivered via line 64 to drive ejector 24. Steam flow through line 64 is regulated by the position of ejector pintle 26.

A recycling line 68 delivers purified hydrogen from line 44 via a pressure regulating valve 70 to a proportional control valve 73 operated by an actuator 75. Also, hydrogen fuel from fuel cell 48 is delivered through a line 74 and a temperature controlled valve 76 to the burner 36 of the reformer. Valve 76 is controlled in response to the temperature in reformer 34 which is sensed by temperature sensor 78, the output of which is delivered to transducer 80 which controls valve 76.

In operation of the system of the present invention, pressure regulators 12, 70 and 58, and flow regulating valves 16 and 73 and pintle 26 are adjusted and/or sized to deliver a greater amount of flow than would be required at the maximum designed operating power point of the fuel cell system; and these valves are also adjusted to provide the proper ratio of raw fuel, recycled hydrogen and steam required for proper operation of the desulfurizer 20 and reformer 34. A pressure responsive actuator 82 having a diaphragm 84 loaded by spring 86 senses the pressure just upstream of isolation valve 46. Variations in pressure upstream of valve 46 cause actuator 82 to stroke to deliver proportioning signals to actuators 18 and 75 to operate their associated proportioning valves. The stroke of actuator 82 also operates actuator 28 to stroke the pintle of ejector 24.

When the system is first started up, the pressure upstream of valve 46 is low, so signals are delivered from pressure responsive actuator 82 to actuators 18, 75 and 28 to open valves 16 and 73 and ejector 24, respectively, for full flow. Raw fuel and steam is then delivered to desulfurizer 20, and the desulfurized fuel and steam are delivered in a mixture from ejector 24 to reformer 34 in the proper mixture so that hydrogen is produced. The hydrogen is then delivered to condenser 42, part of the output of which is recirculated to the inlet of desulfurizer 20 for mixing with the raw fuel to aid in desulfurization. The output from hydrogen condenser 42 is delivered through pressure regulating valve 46 to the fuel cell, pressure regulating valve 46 functioning to maintain a desired pressure to the fuel cell downstream of the valve. The delivery of desulfurized fuel and steam continue until the pressure sensed by actuator 82 becomes high enough to signal actuators 18, 75 and 28 to reduce the pressure flow in valves 16 and 73 and reduce flow through ejector 24. As the hydrogen consumption rate in the system is changed, either by changing consumption in the fuel cell itself (due to variations in load) or by delivering hydrogen from the fuel cell via line 74 to burner 36, the hydrogen pressure downstream of valve 46 will tend to change thus resulting in changes in pressure upstream of valve 46. Increased hydrogen consumption reduces the pressure upstream of valve 46; reduced hydrogen consumption increases the pressure upstream of valve 46. These changes in the pressure upstream of isolation valve 46 cause pressure responsive actuator 82 to again be activated to adjust valves 16 and 73 and ejector 24 to correctly proportion the flow of desulfurized fuel and steam and to establish the appropriate pressure in the system.

Pressure regulator 46 makes it possible for the entire system upstream of the pressure regulator to operate at an elevated pressure above that necessary to feed the fuel cell, so that the system components can constitute a reservoir of hydrogen or hydrogen-forming constituents which guarantees extremely rapid transient response of the power plant. The time lag associated with changing loads on the fuel cell in the prior art is significantly reduced or eliminated. As load on the fuel cell changes, hydrogen is fed on demand to the fuel cell from processor 45. Hydrogen is also fed from the fuel cell via line 74 to burner 36 to maintain the reformer at the proper reaction temperature. The fact that the hydrogen which is fed to reformer burner 36 is first delivered to the fuel cell insures that sufficient hydrogen is available at all times in the fuel cell to support the power load on the cell. Any decrease in the temperature of reformer 34 indicates that there is an insufficient hydrogen flow to burner 36. In this event, the temperature regulating valve 76 will open to increase the flow of fuel to burner 36. The increased flow of hydrogen from the fuel cell to burner 36 results in a decrease in pressure in the fuel cell. This reduced pressure in the fuel cell is sensed by pressure regulating valve 46 which then opens to increase the flow of hydrogen to the fuel cell to reestablish the desired pressure to the fuel cell downstream of the valve. This increase in flow through valve 46 lowers the pressure upstream of the valve 46 and adjusts the proportional setting of valves 16 and 73 and ejector 24 through the reaction of actuator 82. Thus, both the fuel cell flow requirements and the reformer requirements are met and controlled by pressure regulating valve 46.

It will be understood that the system functions in response to either a decrease in or an increase in load on the fuel cell, or to a decrease or increase in reformer temperature. In any of those situations, a change in pressure in the fuel cell will occur and will result in stroking of actuator 84 to change the proportional setting of valves 16 and 73 and ejector pintle 26.

Separation of the fuel processor from the fuel cell allows all of the processor elements to operate at a higher pressure, thus resulting in increased efficiency and/or smaller size of the fuel processor elements. The fuel processor can operate at pressure levels which are optimum for peak performance while maintaining a supply of both hydrogen and a raw fuel and steam mixture for instantaneous response to transient loading conditions on the fuel cell.

Figure 3A:
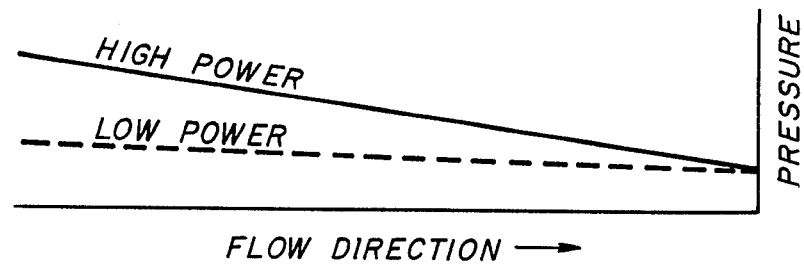
FIG. 3a is a graphic representation of pressure levels in the direction of fuel flow for low power and high power operation in prior art systems.

Referring now to FIG. 3a, a graph is shown depicting low power and high requirements for a typical fuel cell of the prior art. The low power line shows the pressure requirements at various stages in the system with flow direction being from left to right. That is, the leftmost point on the line would be commensurate with the pressure level at an upstream position in the system, such as at the desulfurizer, and moving rightward on the line would be commensurate with going downstream in the system to the fuel cell. As can be seen from the low power line, when the fuel cell is operating at low power only a relatively small pressure drop is experienced in the system. However, a high power load is imposed on the fuel cell, the pressure required at upstream locations to provide the necessary fuel flow to the fuel cell is considerably higher, as indicated by the leftmost point on the high power line. The vertical gap between the low power line and the high power line is commensurate with a time lag in the system required to generate the necessary pressure levels to meet the high power load on the fuel cell.

Figure 3B:
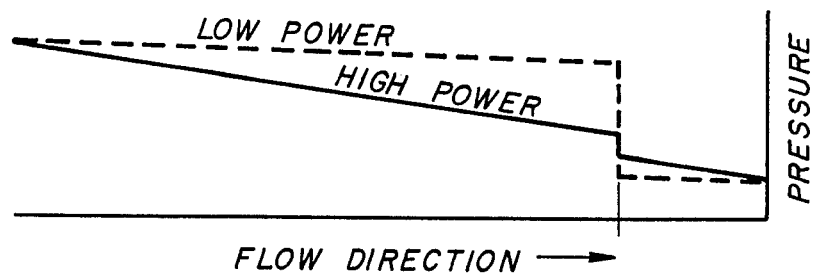
FIG. 3b is a graphic representation of pressure levels in the direction of flow of fuel for low power and high power operation in a system in accordance with the present invention.

Referring now to FIG. 3b, a chart similar to FIG. 3a is presented for the present invention. As previously stated, the system upstream of pressure regulator 46 is operated at pressures sufficient to deliver a greater amount of fuel flow to the fuel cell than will be required at maximum power of the fuel cell system. This fact is indicated by the elevated pressure position of the leftmost point of the low power line in FIG. 3b as compared to FIG. 3a. The slope of the low power line in FIG. 3b is the same as the slope of the low power line in FIG. 3a up to point X, which indicates the position of pressure regulating valve 46 in the system. At pressure regulating valve 46, the operating pressure in the low power line is dropped as shown in FIG. 3b so that the pressure of the fuel delivered to the fuel cell is appropriate for operation of the fuel cell, i.e. at the same delivery pressure as in the system of FIG. 3a. However for high power requirements in accordance with the present invention, the pressure levels always present in the system upstream of valve 46 are always sufficient to maintain the necessary fuel flow to the fuel cell. Thus, for higher power requirements, the high power flow line in the system of the present invention is as shown in FIG. 3b where it starts at an upstream point at the same pressure level as for low power operation and then is reduced as the fuel flows downstream to valve 46 for final reduction appropriate for delivery to the fuel cell. The vertical gap at any point between the low power line and the high power line in FIG. 3b is commensurate with the accumulated reserve in the system.

It can thus be seen, both from the graphic representations in FIGS. 3a and 3b and from the foregoing description that the present invention significantly improves the transient response time of a fuel cell system which is subject to varying loads.

Figure 2:
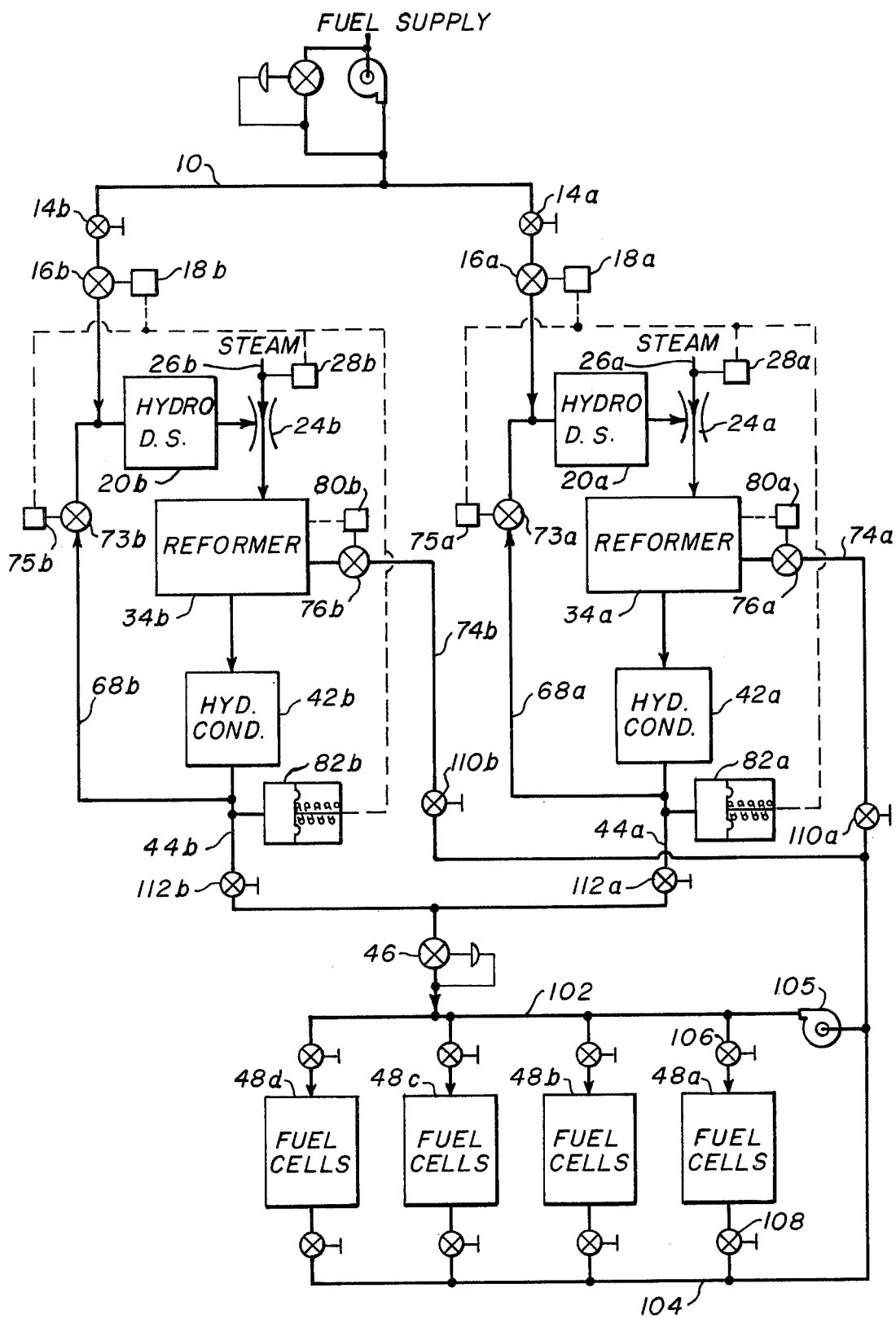
FIG. 2 is a simplified schematic of a ganged array of fuel cell modules and processor modules.

Referring now to FIG. 2, a system is shown in which a number of fuel cell modules are interconnected with a plurality of processor modules. The system shown in FIG. 2 is somewhat simplified merely for purposes of illustration; and elements comparable to the elements of FIG. 1 are similarly numbered followed by letter designations a, b, c, etc. A plurality of fuel cells are connected in parallel between an inlet manifold 102 and an outlet manifold 104. Fuel cells 48a through 48d are shown connected across the inlet and outlet manifolds, and it will be understood that any number of two or more may be connected as shown. A plurality of fuel processors are also connected to feed inlet manifold 102 through a common isolation pressure control valve 46. Two such fuel processor systems are shown connected between a common fuel supply and the common isolation valve 46, and it will be understood that as many processor units as may be desired may be connected in the system. The use of a single common pressure regulator isolating valve 46 eliminates the problem of requiring perfectly matched pressure regulating isolator valves on each fuel cell module to maintain uniform feed to each unit. Also, the use of common inlet and outlet manifolds reduces the problem of flow distributions between each fuel cell module. A hydrogen recirculator 105 may be employed to improve fuel distribution in large systems, but the recirculator is not an essential part of the system. Valves 106 and 108 are located upstream and downstream of each fuel cell module so that the individual fuel cell module may be disconnected from the system if desired by terminating the flow of fuel through the fuel cell. In addition, valves 110a and 110b are incorporated in each of the lines 74a and 74b and valves 112a and 112b and 114a and 114b are incorporated in each of the lines 44a and 44b so that any processor module may be disconnected from the system as desired.

The reformer of each processor module draws fuel for its burner on demand from the fuel exit manifold 104 by means of the burner temperature control valve 76 of each reformer.

As will be apparent to those skilled in the art from the foregoing description of the single processor and fuel cell unit of FIG. 1, any change in the load imposed on the ganged array of fuel cells in the system of FIG. 2 will result in actuation of pressure responsive actuator 82 to continuously proportion the supply of raw fuel, steam and recirculated hydrogen to the ganged processor units.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. Apparatus for producing electricity through an electrochemical reaction comprising:
   fuel cell means;
   fuel conditioning means, said fuel conditioning means generating a gaseous fuel cell fuel from a mixture of fuel constituents;
   means for delivering a fuel stock to said fuel conditioning means, said fuel stock delivering means including first controllable valve means and being designed to deliver a greater flow of fuel stock than required for full power operation of said fuel cell means;
   means for delivering at least one mixing ingredient for mixing with the fuel stock to said fuel conditioning means, said mixing ingredient delivering means including second controllable valve means and being designed to deliver a greater flow than required for full power operation of said fuel cell means;
   means for supplying the gaseous fuel cell fuel generated in said fuel conditioning means to said fuel cell means, said fuel supplying means including controllable isolation valve means;
   means for sensing the load on said fuel cell means and for generating a control signal commensurate therewith;
   means responsive to said control signal commensurate with fuel cell means load for controlling said isolation valve means to vary the flow of fuel through said isolation valve means to said fuel cell means in response to the load on said fuel cell means;
   means for sensing the fuel conditioning means fuel discharge pressure and for generating a signal commensurate therewith; and
   means responsive to said signal commensurate with fuel conditioning means discharge pressure for controlling said first and second valve means of said delivering means to regulate the flow of fuel stock and mixing ingredient to said fuel conditioning means.

2. The apparatus of claim 1 wherein said fuel conditioning means includes reactor means having a burner associated therewith and wherein said apparatus further comprises:
   means for delivering fuel from said fuel cell means to said reactor means burner;
   means for sensing the temperature in said reactor means and generating a signal commensurate therewith;
   flow control means in said means for delivering fuel from said fuel cell to said reactor means burner to regulate fuel flow to said burner; and
   means responsive to said signal commensurate with reactor means temperature for adjusting the rate of delivery of fuel to said burner to maintain a constant reactor means temperature, said adjusting means controlling the operation of said flow control means.

3. The apparatus of claim 1 wherein said fuel conditioning means includes means for mixing the fuel stock and mixing ingredient and wherein said means for controlling the delivery of mixing ingredient includes means for varying the flow through said mixing means.

4. The apparatus of claim 2 further comprising:
   means for controllably withdrawing fuel from said fuel conditioning means for mixing with said fuel stock upstream of said fuel conditioning means; and
   means responsive to said signal commensurate with fuel conditioning means discharge pressure for varying the rate of withdrawal of fuel from said fuel conditioning means for mixing with said fuel stock.

5. The apparatus of claim 4 further comprising:
   desulfurizing means, said desulfurizing means being connected downstream of the mixing point of said fuel stock and fuel withdrawn from said fuel conditioning means, said withdrawal rate varying means being positioned upstream of said desulfurizing means.

* * * * *